United States Patent [19]

Ebisu et al.

[11] Patent Number: 5,698,320

[45] Date of Patent: Dec. 16, 1997

[54] IMAGE FORMING DEVICE

[75] Inventors: Katsuji Ebisu; Toshiaki Narusawa; Norio Sawatari; Takahiro Kashikawa; Tomoaki Tanaka, all of Kawasaki, Japan

[73] Assignee: Fujitsu Limited, Kawasaki, Japan

[21] Appl. No.: 430,490

[22] Filed: Apr. 28, 1995

[30] Foreign Application Priority Data

Aug. 8, 1994 [JP] Japan .................................. 6-185904

[51] Int. Cl.⁶ ...................................................... B32B 9/00
[52] U.S. Cl. ........................ 428/373; 428/394; 428/447; 355/282; 355/285; 430/124
[58] Field of Search ................................ 428/447, 373, 428/394; 355/282, 285; 430/124

[56] References Cited

U.S. PATENT DOCUMENTS

| 5,102,741 | 4/1992 | Miyabayashi | 428/447 |
| 5,327,202 | 7/1994 | Nami | 355/282 |

FOREIGN PATENT DOCUMENTS

| 58-14173 | 1/1983 | Japan . |
| 63-17934 | 1/1988 | Japan . |
| 63-113580 | 5/1988 | Japan . |
| 3-190951 | 8/1991 | Japan . |
| 5-96658 | 4/1993 | Japan . |
| 5-202205 | 8/1993 | Japan . |

OTHER PUBLICATIONS

Tribologyst, vol. 37, No. 6, pp. 501–504 (1992).

*Primary Examiner*—Patrick Ryan
*Attorney, Agent, or Firm*—Armstrong,Westerman, Hattori,McLeland & Naughton

[57] ABSTRACT

An image forming device is provided which can prolong the service life of a fixing roll and provide a good anti-offset property, an image having high surface smoothness and good printing properties.

A fixer for electrophotography, wherein an electrostatic latent image is developed, comprises a fluororesin-coated fixing roll (2, 9) for fixing a toner and a mechanism (5, 12, 12a, 12b) for coating a fluorosilicone polymer as a release agent onto the surface of the fixing roll.

47 Claims, 2 Drawing Sheets

IMAGE FORMING DEVICE

BACKGROUND OF THE INVENTION

1. Field of the Invention

The present invention relates to an image forming device which can prolong the service life of a toner fixer used in electrophotography, reduce the consumption of a release agent, and provide a good print image.

2. Description of the Related Art

Electrophotography, adopted in copying machines, laser beam printers, and the like, is a process which generally comprises uniformly applying electrostatic charges onto the surface of a photoconductive insulating layer, applying light to the insulating layer to partially remove the electrostatic charges to form an electrostatic latent image, attaching a fine powder, called toner, to the areas where the electrostatic charges remain, thereby visualizing the latent image to form a toner image (this step being called "development"), and heat-fixing the toner image onto recording paper to provide a print.

Various fixation systems are known for the above fixation. Especially, by virtue of its high heat efficiency, lack of danger of fire, and other advantages, a hot roll fixation system, comprising a rotary hot roll containing a heat source and a pressure roll which rotates in contact with the hot roll, has found widespread practical use. In this case, aluminum rolls are generally used as the hot roll and the pressure roll.

The use of an aluminum roll, however, is disadvantageous in that, due to the hardness of the aluminum roll, the fixed image formed after heat-melting the toner has a rough surface, i.e., poor surface smoothness, and, for monochrome printing, graphic printing or the like, causes uneven portions on the surface of a solid black image, deteriorating the image quality. This phenomenon is significant when printing images using color toners, such as scene images. Therefore, the formation of a fixed image having high smoothness has been desired in the art.

In order to improve the smoothness of the fixed image, a silicone rubber or the like as a material for the roll is preferably used to reduce the roll hardness. The silicone oil, however, is disadvantageous in that a silicone oil, as a fixing oil, is used for preventing offset swells in the silicone rubber and, further, the surface of the roll is likely to be scraped, upon contact with paper or the like, and roughened to shorten the service life of the roll.

The use of a fluororesin-coated silicone rubber as a fixing roll enables the durability of the roll to be improved while maintaining good image smoothness, because the durability of the roll surface alone is improved without a significant reduction in the hardness of the roll.

However, when a conventional silicone oil is used as an offset preventive to be coated onto the roll, the poor affinity of the fluororesin for the silicone oil makes it impossible to uniformly and thinly coat the silicone oil on the surface of the roll, and this requires feed of an excessive amount of oil, resulting in large consumption of the oil. Further, in this case, the heat efficiency in the fixation by means of the hot roll is lowered, which necessitates raising the fixation temperature. Furthermore, since the silicone oil cannot be uniformly applied, offset partially occurs, reducing the anti-offset effect.

In particular, in the case of a color toner, in which importance is attached to the smoothness of an image, the viscoelasticity of the toner is intentionally lowered, causing the color toner to be more likely to cause offset as compared with the conventional black toner. This has led to a requirement for an oil which can be coated uniformly.

Accordingly, an object of the present invention is to provide an image forming method, which, in electrophotography wherein a electrostatic latent image is developed, can prolong the service life of a fixing roll, reduce the consumption of a release agent, lower the fixation initiation temperature, and provide a good anti-offset property and an image having a high surface smoothness and good printing properties.

SUMMARY OF THE INVENTION

The above object can be attained by using a fluororesin-coated roll as a fixing roll for fixing a toner and by using a fluorosilicone polymer as a release agent to be coated onto the surface of the fixing roll.

A fluororesin-coated fixing roll capable of realizing prolonged service life and high image smoothness, because the roll surface is formed of a fluororesin, has poor affinity for the conventional silicone oil, making it impossible to uniformly and thinly coat the silicone oil. The introduction of fluorine into the molecule of silicone, however, has improved the affinity of the silicone oil for the fluororesin, enabling the silicone oil to be uniformly and thinly coated onto the roll.

Further, since the oil can be thinly coated, there is no need to coat excess oil onto the roll. Furthermore, since the oil can be uniformly coated, there is no possibility that a portion exists where the oil is not coated, which contributes to an improvement in an anti-offset effect.

A fluorosilicone polymer having a long-chain fluoroalkyl group has particularly good affinity for the fluororesin-coated roll, so that it can be uniformly and thinly coated on the surface of the roll.

DESCRIPTION OF PREFERRED EMBODIMENTS

Figure 3:
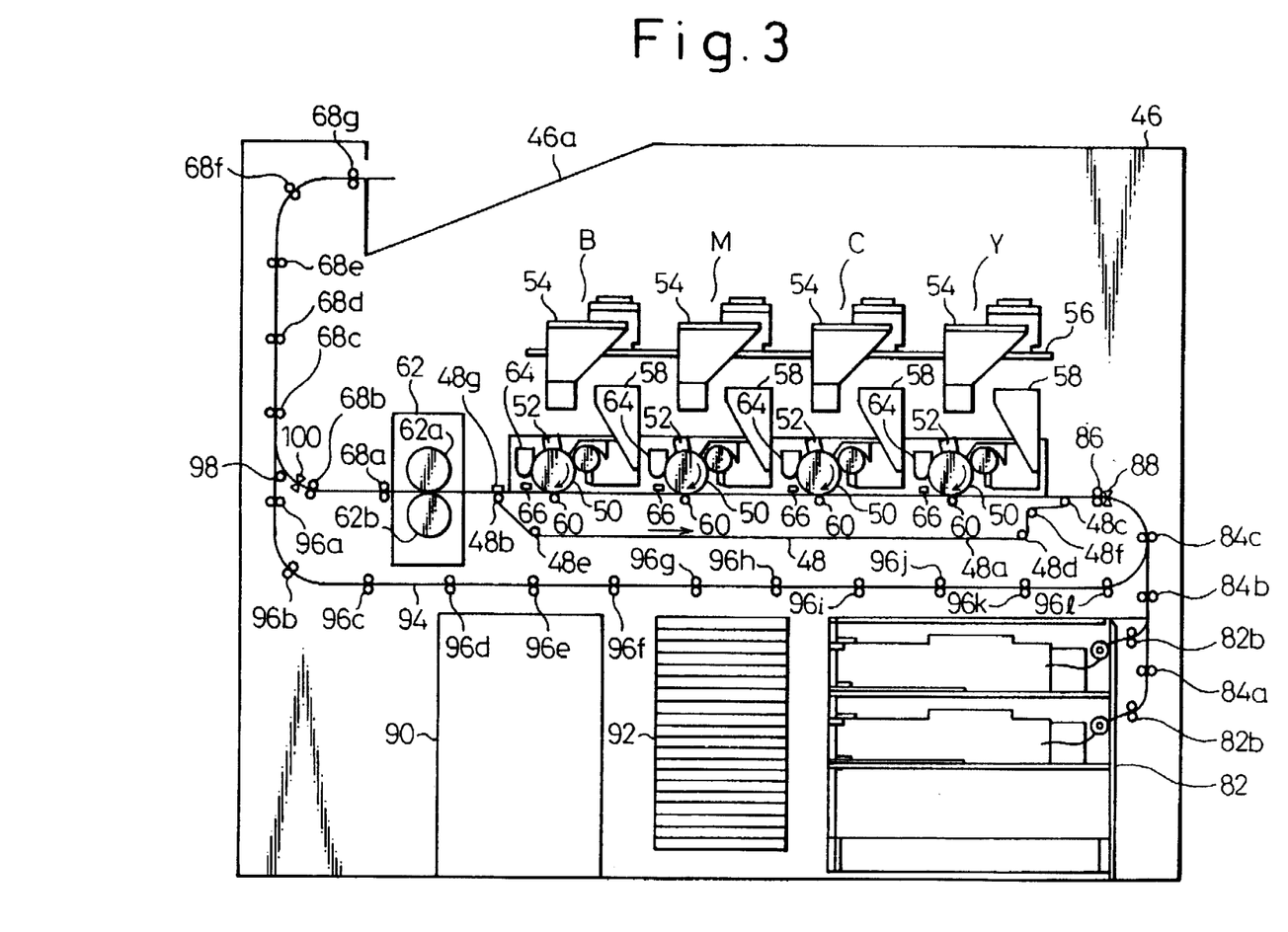
FIG. 3 is a diagram showing an image forming device according to an embodiment of the present invention.

FIG. 3 shows a layout of the whole multicolor image forming device according to the present invention. In this device, an endless belt carrying means 48 for carrying a recording medium, for example, recording paper, is provided in substantially the middle of a housing 46. In the endless belt carrying means 48, an endless belt 48a formed of a flexible dielectric material is hung on the periphery of four rolls 48b, 48c, 48d, and 48e. A suitable tension is applied to the endless belt 48a by means of a tension roll 48f.

A running section on the upper side of the endless belt 48a, that is, a running section defined by a drive roll 48b and a follower roll 48c, constitutes a recording paper moving path, and recording paper is introduced from a follower roll 48c and discharged from a drive roll 48b. When the recording paper is introduced from the follower roll 48c, the recording paper is electrostatically adsorbed onto the endless belt 48a by taking advantage of electrification of the endless belt 48a. An AC discharge 48g is provided on the side of the drive roll 46b. It removes charges from the endless belt 48a, enabling the recording paper to be easily separated from the belt.

Four electrostatic recording units Y (for a yellow toner image), C (for a cyan toner image), M (for a magenta toner image), and B (for a black toner image) are disposed, in series, along the upper running section of the endless belt 48 from its upstream side toward its downstream side. Each unit is equipped with a photosensitive drum 50 which, during recording operation, is rotated in a direction indicated by an arrow in the drawing. Above each photosensitive drum 50, an electrifier 52, a laser beam scanner 54, and a developing device 58 for developing a latent image using a toner of a predetermined color are provided. A transfer roll 60 is disposed below each photosensitive drum 50.

When recording paper is introduced from the follower roll 48c of the endless belt carrying means 48 and successively passed through electrostatic recording units Y, C, M, and B, toner images of four colors are put on top of one another on the recording paper to form a full-color image. The recording paper is then carried from the drive roll 48b of the endless belt carrying means 48 toward a hot fixer 62 equipped with a hot roll 62a and a pressure roll 62b, where the full-color image is heat-fixed onto the recording paper.

The recording paper which has passed through the fixer 62 is carried in a substantially vertical direction along a discharge path comprising paper feed guide rolls 68a to 68g and then discharged on an upper tray 46a of the housing 46.

Numeral 82 designates a paper feed section, numeral 82a a paper feed roll, numeral 82b a paper feed roll, numerals 84a to 84c each a paper feed guide roll, numeral 86 a resist roll, numerals 88 and 100 each a paper sensor, numeral 90 a power source, numeral 92 a control section, numeral 94 a paper reversing path, numerals 96a to 96l each a paper guide roll, and numeral 98 a paper switching roll.

The whole image forming device will now be described.

For a fixer provided in the image forming device of the present invention, as described below, a fluororesin-coated roll is used as a fixing roll for fixing a toner, and a fluorosilicone polymer is used as a release agent to be coated onto the surface of a fixing roll.

Fluorosilicone polymers represented by the following chemical formula 17 have an enhanced affinity for the fluororesin-coated roll and, hence, can be uniformly and thinly coated onto the surface of the roll.

$$\begin{array}{c} R_f \\ | \\ R_1 \\ | \\ -(SiO)_n- \\ | \\ R_2 \end{array} \quad (17)$$

wherein $R_1$ represents an alkylene group or phenylene group, $R_2$ represents an alkyl, aryl, or olefinically unsaturated group and $R_f$ represents a perfluoroalkyl group having 2 to 15 carbon atoms.

Fluorosilicone polymers represented by the following chemical formula 18, by virtue of a small number of fluorine atoms, are advantageous in cost and have a high affinity for the fluororesin-coated roll.

(18)

wherein $R_1$ represents an alkylene or phenylene group, $R_2$ represents an alkyl, aryl, or olefinically unsaturated group and $R_f$ represents a perfluoroalkyl group having 3 to 9 carbon atoms.

Fluorosilicone polymers represented by the following chemical formula 19, by virtue of a higher fluorine content based on the same molecular weight, than that of the above fluorosilicone polymers, are advantageous particularly when the production of a fluorosilicone polymer having a low molecular weight and a low viscosity is contemplated.

(19)

wherein $R_1$ and $R_2$ represent an alkylene or phenylene group and $R_{f1}$ and $R_{f2}$ represent a perfluoroalkyl group having 2 to 15 carbon atoms.

Fluorosilicone polymers represented by the following chemical formula 20, by virtue of a small number of fluorine atoms, are advantageous in cost and have a high affinity for the fluororesin-coated roll.

(20)

wherein $R_1$ and $R_2$ represent an alkylene or phenylene group and $R_{f1}$ and $R_{f2}$ represent a perfluoroalkyl group having 3 to 9 carbon atoms.

When the above fluorosilicone polymers are prepared by polymerizing a cyclic polysiloxane, having a fluoroalkyl group, in an inert solvent capable of dissolving the cyclic polysiloxane and a polymer of the cyclic polysiloxane in the presence of a basic polymerization catalyst and then terminating the polymerization, the polymers have particularly excellent heat stability and can remain unchanged even when exposed to 200° C. temperatures.

In the production of the above fluorosilicone polymers, when cyclic trisiloxanes represented by the following chemical formulae 21 and 22 are used, the fluorosilicone polymers can be produced easily and at low cost.

(21)

wherein $R_1$ represents an alkylene or phenylene group, $R_2$ represents an alkyl, aryl, or olefinically unsaturated group and $R_f$ represents a perfluoroalkyl group having 2 to 15 carbon atoms.

(22)

wherein $R_1$ and $R_2$ represent an alkylene or phenylene group and $R_{f1}$ and $R_{f2}$ represent a perfluoroalkyl group having 2 to 15 carbon atoms.

In fluorosilicone polymers represented by the following chemical formula 23, the use of a mixture of fluorosilicone polymers different from each other in the number of carbon atoms in $R_f$ enables the fluorine content and the viscosity to be regulated as desired.

(23)

wherein $R_1$ represents an alkylene or phenylene group, $R_2$ represents an alkyl, aryl, or olefinically unsaturated group and $R_f$ represents a perfluoroalkyl group having 2 to 15 carbon atoms.

Fluorosilicone polymers represented by the following chemical formula 24, 25, 26, 27, 28, 29, 30, and 31 are advantageous in that the regulation of n and m facilitates the regulation of the fluorine content and the viscosity.

(24)

wherein $R_1$, $R_3$, $R_4$, $R_5$, $R_6$, $R_7$, and $R_8$ each represent an alkylene or phenylene group, $R_2$ represents an alkyl, aryl, or olefinically unsaturated group and $R_f$ represents a perfluoroalkyl group having 2 to 15 carbon atoms and m and n are integers satisfying the formula $n/(n+m) \geq 0.1$.

(25)

wherein $R_1$, $R_3$, $R_4$, $R_5$, $R_6$, $R_7$, and $R_8$ each represent an alkylene or phenylene group, $R_2$ represents an alkyl, aryl, or olefinically unsaturated group and $R_f$ represents a perfluoroalkyl group having 3 to 9 carbon atoms and m and n are integers satisfying the formula $n/(n+m) \geq 0.1$.

(26)

wherein $R_1$, $R_3$, $R_4$, $R_5$, $R_7$, and $R_8$ each represent an alkylene or phenylene group, $R_2$ and $R_6$ each represent an alkyl, aryl, or olefinically unsaturated group and $R_{f1}$ and $R_{f2}$ each represent a perfluoroalkyl group having 2 to 15 carbon atoms and m and n are integers satisfying the formula $n/(n+m) \geq 0.1$.

(27)

wherein $R_1$, $R_3$, $R_4$, $R_5$, $R_7$, and $R_8$ each represent an alkylene or phenylene group, $R_2$ and $R_6$ each represent an alkyl, aryl, or olefinically unsaturated group and $R_{f1}$ and $R_{f2}$ each represent a perfluoroalkyl group having 3 to 9 carbon atoms and m and n are integers satisfying the formula $n/(n+m) \geq 0.1$.

(28)

wherein $R_f$ represents a perfluoroalkyl group having 2 to 15 carbon atoms and m and n are integers satisfying the formula $n/(n+m) \geq 0.1$.

(29)

wherein $R_f$ represents a perfluoroalkyl group having 3 to 9 carbon atoms and m and n are integers satisfying the formula $n/(n+m) \geq 0.1$.

(30)

wherein $R_{f1}$ and $R_{f2}$ each represent a perfluoroalkyl group having 2 to 15 carbon atoms and m and n are integers satisfying the formula $n/(n+m) \geq 0.1$.

(31)

wherein $R_{f1}$ and $R_{f2}$ each represent a perfluoroalkyl group having 3 to 9 carbon atoms and m and n are integers satisfying the formula $n/(n+m) \geq 0.1$.

Two examples of the process for producing these polymers will not be described. [Production Example 1] A fluorosilicone polymer may be prepared by polycondensing a co-hydrolyzate of $R_fC_2H_4(CH_3)SiCl_2$ and $(CH_3)_2SiCl_2$ in the presence of $(CH_3)_3SiOSi(CH_3)_3$ as a molecular weight modifier and an acid catalyst such as trifluoromethanesulfonic acid or sulfuric acid, or an alkali catalyst such as sodium hydroxide or potassium hydroxide.

[Production Example 2] A fluorosilicone polymer may be prepared by ring-opening polymerization of $[R_fC_2H_4(CH_3)SiO]_x$ and $[(CH_3)_2SiO]_y$, wherein x and y are an integer of 3 to 5, in the presence of $(CH_3)_3SiOSi(CH_3)_3$ and an acid catalyst such as trifluoromethanesulfonic acid or sulfuric acid.

When the fluorosilicone polymer has an excessively low fluorine content, it has poor affinity for the hot roll. On the other hand, when it has an excessively high fluorine content, the viscosity thereof becomes excessively high. For this reason, the fluorine content is preferably 5 to 80% with a fluorine content of 20 to 60% being particularly preferred and proving better properties.

Further, for the above fluorosilicone polymer, when the molecular weight is low, coating of the fluorosilicone polymer onto the hot roll heated to about 180° C. results in vaporization of low-molecular weight components. On the other hand, when the molecular weight is excessively high, the viscosity is excessively high, which increases the production cost.

For this reason, preferably, the fluorosilicone oil has a number average molecular weight of 1,000 to 30,000 and a weight average molecular weight of 1,500 to 40,000. In the fluorosilicone polymer, the low-molecular weight components are likely to vaporize upon coating onto the hot roll, resulting in contamination of the device. When the proportion of a fluorosilicone polymer having a molecular weight of not more than 500 to the whole fluorosilicone polymer is less than 5%, the vaporization can be prevented. Further, when the proportion of a fluorosilicone polymer having a molecular weight of not more than 1500 is less than 5%, the polymer can be used at a higher hot roll temperature.

The surface tension of the fixing oil has a significant correlation with the affinity for the hot roll. When it is excessively large, the affinity of the fixing oil for the hot roll becomes poor. When it is not more than 20 dyn/cm$^2$, the affinity of the fixing oil for the fluororesin-coated roll is good.

The viscosity of the fluorosilicone polymer should be varied depending upon the method used for coating the fluorosilicone polymer onto the roll. When the viscosity is excessively low, the fluorosilicone polymer cannot be stably held in a fixing oil coating member. On the other hand, when the viscosity is excessively high, the feed of the fluorosilicone polymer from an oil tank to the roll becomes difficult. For the above reason, for a device wherein a feeding mechanism for feeding the fluorosilicone polymer from the oil tank to the roll is provided as a coating mechanism for the fixing oil, the viscosity of the fluorosilicone polymer at 25° C. is preferably 10 to 3,000 cSt.

Further, for a device wherein a cleaning member in contact with the roll is provided as a coating mechanism, the viscosity of the fluorosilicone polymer at 25° C. is preferably 1,000 to 60,000 cSt.

Furthermore, when the contact angle of the fluorosilicone polymer with a teflon plate is not more than 20°, the fluorosilicone polymer has good affinity for the fluororesin-coated roll. The contact angle is still preferably not more than 15°. When it exceeds 20°, the fluorosilicone polymer has poor affinity for the fluororesin-coated roll.

When a fluorosilicone polymer is used as the fixing oil, it should not vaporize at 200° C. because it is coated on the surface of a roll heated to 160° to 200° C. If the fluorosilicone polymer vaporizes at 200° C., the device will be unfavorably contaminated with the oil.

Further, when the step of fixation is carried out in such a manner that a fluororesin-coated roll is used as the fixing roll for fixing the toner, a mechanism for coating a release agent onto the fixing roll is provide on the surface of the fixing roll and a fluorosilicone polymer is used as the release agent, it is preferred for the pressure of the fixing roll to be set at 1 to 4 kgf/cm$^2$. Coating of the fluorosilicone polymer under the above conditions enables prolongation of the service life of the roll and a high quality of the fixed image to be simultaneously attained.

When the pressure is excessively low, the smoothness of the image is deteriorated, resulting in lowered image quality. On the other hand, when it is excessively high, the pressure greatly affects the roll, shortening the service life of the roll.

The fluororesin as a coating on the surface of the roll is preferably a perfluoroalkoxy resin. This resin has high affinity for the fluorosilicone polymer, and the service life of the roll can be prolonged.

Further, the fluororesin as a coating on the surface of the roll is preferably polytetrafluoroethylene. This resin has high affinity for the fluorosilicone polymer, and the service life of the roll can be prolonged. Furthermore, the incorporation of a conductive fine powder into the fluororesin results in further improved affinity for the fluorosilicone polymer, improving the anti-offset effect.

In the fluororesin-coated roll as the fixing roll for fixing a toner, when the thickness of the above fluororesin coating is excessively small, the coating strength becomes unsatisfactory, making it difficult to prolong the service life of the roll. On the other hand, when the thickness is excessively large, the hardness becomes excessively large, so that the smoothness of the image is deteriorated. For this reason, the thickness of the fluororesin coating is preferably 10 to 100 μm.

In the fixation according to the present invention, the effect of the present invention is particularly good when the fixation temperature is higher than that usually employed in the art. A fixation system where the roll temperature is 160° to 200° C. is preferred. When the rubber hardness of the intermediate layer in the fixing roll is excessively low, the strength becomes insufficient. On the other hand, when the rubber hardness is excessively high, the smoothness of the fixed image is deteriorated. For this reason, the use of an elastic material having a rubber hardness of 10° to 60° is preferred as the intermediate layer of the roll. The use of silicone rubber as the elastic material can realize the proper strength and hardness.

The image forming method of the present invention is not very dependant upon the speed of the printer, and the effect thereof can be attained in a wide range of process speeds. The effect attained is particularly excellent when the present invention is carried out using a printer wherein the process speed is 10 to 300 mm/sec.

Further, the application of the image forming method of the present invention to monochrome printing which can realize a glossiness of not less than 10 can particularly offer the effect of prolonging the service life of the hot roll and providing a high-quality image.

Furthermore, when the image forming method of the present invention is carried out using a printer for color printing of two or more colors, it can particularly offer the effect of prolonging the service life of the hot roll and providing a high-quality image.

Furthermore, when the image forming method of the present invention is carried out using a printer for full-color printing, it can particularly offer the effect of prolonging the service life of the hot roll and providing a high-quality image.

The image forming method of the present invention is influenced particularly by the viscoelasticity of the toner. Specifically, when it is excessively low, the offset temperature is low. On the other hand, when it is excessively high, the smoothness of the image is deteriorated. For this reason, the viscoelasticity of the toner is preferably such that, at 150° C., the loss elastic modulus is 10 to 10$^5$ dyn/cm$^2$ and the storage modulus is 10 to 10$^5$ dyn/cm$^2$.

When the fixing oil absorption of the toner is high, the toner absorbs the fixing oil during fixation, resulting in a failure in fixation and a deteriorated color tone. For this reason, the fluorosilicone polymer absorption of the toner is preferably less than 1%.

Further, the fluorosilicone polymer used in the present invention does not lose its inherent excellent properties even when mixed with the conventional silicone oil. Therefore, it can be mixed with an inexpensive silicone oil.

Furthermore, for the toner used in the present invention, epoxy resin, styrene/acrylic ester copolymer, polyester resin, polyurethane resin, and the like are considered as a binder resin. Among them, polyester resin is preferred because it can provide good mixing of colors and transparency.

For a black toner, Black pearls L and Vulcan XC72 (manufactured by Cabot Corporation) may be used as carbon, and Oil Black BY and Bontron N-01 (manufactured by Orient Chemical Industries, Ltd.) and may be used as a charge control agent.

Colorants for a color toner may be as follows.

Examples of benzidine organic pigments usable in the present invention include C. I. 21090 (Pigment Yellow 12, KET Yellow 406, manufactured by Dainippon Ink and Chemicals, Inc.), C. I. 21095 (Pigment Yellow 14, KET Yellow 404, manufactured by Dainippon Ink and Chemicals, Inc.), and C. I. 21100 (Pigment Yellow 13, KET Yellow 405, manufactured by Dainippon Ink and Chemicals, Inc.). This pigment has good dispersibility in a binder resin and good spectral reflecting properties.

Examples of quinacridone organic pigments usable in the present invention include C. I. 73916 (Pigment Red 122, KET Red 309, manufactured by Dainippon Ink and Chemicals, Inc.). This pigment has good dispersibility in a binder resin and good spectral reflecting properties.

Examples of rhodamine organic pigments usable in the present invention include C. I. 45160 (Pigment Red 81, Ultra Rose R, manufactured by Toyo Ink Manufacturing Co., Ltd.). This pigment has good dispersibility in a binder resin and good spectral reflecting properties.

Examples of phthalocyanine organic pigments usable in the present invention include C. I. 74160 (Pigment Blue 15, KET Blue 102, KET Blue 103, KET Blue 104, KET Blue 105, KET Blue 106, and KET Blue 111, manufactured by Dainippon Ink and Chemicals, Inc.), and C. I. 74260 (Pigment Green 7, KET Green 201, manufactured by Dainippon Ink and Chemicals, Inc.). This pigment has good dispersibility in a binder resin and good spectral reflecting properties.

Metallized dyes, fatty acid esters, and compounds having an amino group may be added as the charge control agent.

The toner used in the present invention may be prepared by any conventional method. Specifically, the above binder resin and the above pigment and, if necessary, added thereto, wax, charge control agent, etc. are melt-kneaded together and are homogeneously dispersed, for example, by means of pressure kneader, extruder, or the like and classified, by air classification or the like, to prepare a desired toner.

The present invention will now be described in more detail with reference to the following examples and comparative examples. However, the present invention is not intended to be limited thereby.

EXAMPLES

Fluorosilicone polymers, toners, and fixing mechanisms used in the following examples will now be described.

(1) Fluorosilicone polymers were produced as follows.

[Fluorosilicone polymer 1 (low viscosity type)]

A 200-ml flask was charged with 20 g of —[$C_4F_9C_2H_4Si(CH_3)O$]$_3$— and 20 g of trichlorotrifluoroethane in an argon atmosphere, and KOH in such an amount as to provide K/Si=1/400 and dicyclohexyl-18-crown-6 in a molar amount equal to KOH were added thereto. Polymerization was allowed to proceed at 20° C. for 5 min, and trimethylchlorosilane was added to the system to terminate the polymerization. Thus, a fluorosilicone polymer was prepared.

The fluorosilicone polymer had a fluorine content of 30%, a number average molecular weight of 5000, and a weight average molecular weight of 10000. The proportion of a fluorosilicone polymer having a molecular weight of not more than 500 to the whole fluorosilicone polymer was 2%. Further, the fluorosilicone polymer had a surface tension of 18 dyn/cm$^2$ and a viscosity at 25° C. of 2000 cSt.

[Fluorosilicone polymer 2 (high viscosity type)]

A 200-ml flask was charged with 20 g of —[$C_4F_9C_2H_4Si(CH_3)$)]$_3$— and 20 g of trichlorotrifluoroethane in an argon atmosphere, and KOH in such an amount as to provide K/Si=1/1000 and dicyclohexyl-18-crown-6 in a molar amount equal to KOH were added thereto. Polymerization was allowed to proceed at 10° C. for 25 min, and trimethylchlorosilane was added to the system to terminate the polymerization. Thus, a fluorosilicone polymer was prepared. The fluorosilicone polymer had a fluorine content of 40%, a number average molecular weight of 25,000, and a weight average molecular weight of 35,000. The proportion of a fluorosilicone polymer having a molecular weight of not more than 1,500 to the whole fluorosilicone polymer was 3%. Further, the fluorosilicone polymer had a surface tension of 17 dyn/cm$^2$ and a viscosity at 25° C. of 30,000 cSt.

[Fluorosilicone polymer 3 (low viscosity type)]

A 200-ml flask was charged with 20 g of —[$C_4F_9C_2H_4Si(C_4F_9C_2H_4)O$]$_3$— and 30 g of trichlorotrifluoroethane in an argon atmosphere, and KOH in such an amount as to provide K/Si=1/600 and dicyclohexyl-18-crown-6 in a molar amount equal to KOH were added thereto. Polymerization was allowed to proceed at 20° C. for 5 min, and trimethylchlorosilane was added to the system to terminate the polymerization. Thus, a fluorosilicone polymer was prepared. The fluorosilicone polymer had a fluorine content of 60%, a number average molecular weight of 7,000, and a weight average molecular weight of 12,000. The proportion of a fluorosilicone polymer having a molecular weight of not more than 500 to the whole fluorosilicone polymer was 1%. Further, the fluorosilicone polymer had a surface tension of 15 dyn/cm$^2$ and a viscosity at 25° C. of 2,500 cSt.

[Fluorosilicone polymers 4, 5, and 6]

Two examples of the process for producing a fluorosilicone polymer 4, represented by the following chemical formula 32, a fluorosilicone polymer 5 represented by the following chemical formula 33, and a fluorosilicone polymer 6 represented by the following chemical formula 34 will now be described.

Production Example 1: The fluorosilicone polymer may be prepared by polycondensing a co-hydrolyzate of $R_fC_2H_4(CH_3)SiCl_2$ and $(CH_3)_2SiCl_2$ in the presence of $(CH_3)_3SiOSi(CH_3)_3$ as a molecular weight modifier and an acid catalyst, such as trifluoromethanesulfonic acid or sulfuric acid, or an alkali catalyst, such as sodium hydroxide or potassium hydroxide.

Production Example 2: The fluorosilicone polymer may be prepared by ring-opening polymerization of [$R_fC_2H_4(CH_3)SiO$]$_x$ and [$(CH_3)_2SiO$]$_y$ [wherein x and y are an integer of 3 to 5] in the presence of $(CH_3)_3SiOSi(CH_3)_3$ and an acid catalyst such as trifluoromethanesulfonic acid or sulfuric acid.

(32)

[Fluorosilicone polymer 5] (n/(n + m) = 0.1)

(33)

[Fluorosilicone polymer 6]

(34)

(2) Process for producing a toner will now be described.

| [Toner 1 (black)] | |
|---|---|
| Binder resin: polyester resin (softening point 130° C.) | 92 parts by weight |
| Colorant: Black pearls L (manufactured by Cabot Corporation) | 4 parts by weight |
| Charge control agent: BONTRON E81 (manufactured by Orient Chemical industries, Ltd.) | 2 parts by weight |
| Wax: Viscol 660-P (manufactured by Sanyo Chemical Industries) | 2 parts by weight |

The above components were mixed together, by stirring in a ball mill, and the mixture was melt-kneaded by means of an extruder heated to 140° C. The melt was cooled for solidification. The solid was coarsely ground by means of a crusher and milled by means of a jet mill. The resultant fine powder was classified by means of an air classifier to prepare a toner having a size of 5 to 20 μm.

The storage modulus and loss elastic modulus (measuring conditions: frequency 1 Hz) of the toner were measured with a viscoelasticity measuring device (RDS2) manufactured by Rheometrix Corp. and found to be 8,000 dyn/cm² and 12,000 dyn/cm², respectively.

Further, the absorption of the above fluorosilicone polymer into the toner was measured and found to be as low as 0.05% by weight.

| [Toner 2 (color)] | |
|---|---|
| Binder resin: polyester resin (softening point 120° C.) | 92 parts by weight |
| Colorant: KET Yellow 406 (manufactured by Dainippon Ink and Chemicals; Inc.) | 4 parts by weight |
| Charge control agent: BONTRON E81 (manufactured by Orient Chemical industries, Ltd.) | 2 parts by weight |
| Wax: Viscol 660-P (manufactured by Sanyo Chemical Industries) | 2 parts by weight |

The above components were mixed together by stirring in a ball mill, and the mixture was melt-kneaded by means of an extruder heated to 140° C. The melt was cooled for solidification. The solid was coarsely ground by means of a crusher and milled by means of a jet mill. The resultant fine powder was classified by means of an air classifier to prepare a toner having a size of 5 to 20 μm.

Toners having other colors were prepared on an experimental basis in the same manner as described above, except that only the above yellow toner and pigment were changed. C. I. 45160 (Pigment Red 81, Ultra Rose R, manufactured by Toyo Ink Manufacturing Co., Ltd.) was used, and, for a cyan toner, C. I. 74160 (Pigment Blue 15, KET Blue 102, manufactured by Dainippon Ink and Chemicals, Inc.) was used.

The toners were subjected to measurements of storage modulus and loss elastic modulus (measuring conditions: frequency 1 Hz) using a viscoelasticity measuring device (RDS2) manufactured by Rheometrix Corp. As a result, for all the three color toners, the storage modulus and the loss elastic modulus were 5,000 dyn/cm² and 12,000 dyn/cm², respectively.

Further, the absorption of the above fluorosilicone polymer into the toners was measured and found to be as low as 0.05% by weight.

(3) Fixers used in the following examples were constructed as follows.

[Fixer 1 (equipped with oil felt)]

Figure 1:
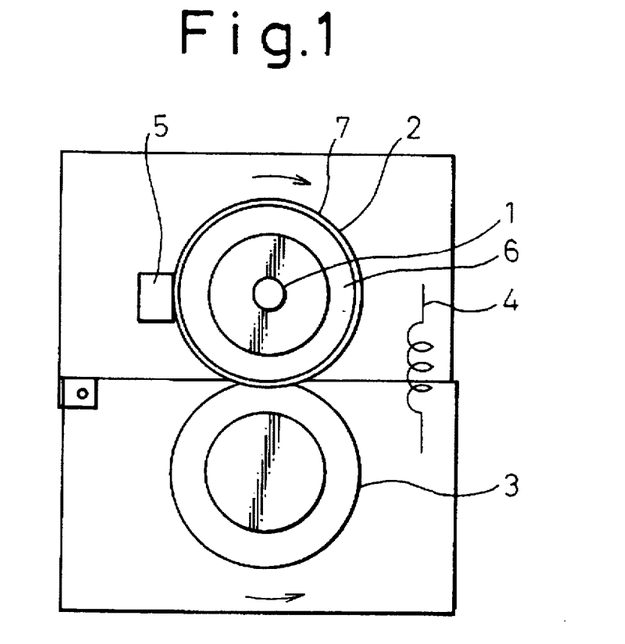
FIG. 1 is a diagram showing a fixer according to an embodiment of the present invention.

The fixer, according to the first embodiment of the present invention, as shown in FIG. 1 comprises a hot roll 2, containing a heater 1, and a pressure roll 3. Both rolls are provided with a supplementary spring 4, at both sides, to bring the hot roll and the pressure roll into press contact with each other at 2 kgf/m².

When a fixing oil containing, as a release agent, a fluorosilicone polymer, which is a characteristic feature of the present invention, is used, it was impregnated into a felt 5 which was then brought into press contact with the fixing roll. The hot roll comprised a core of aluminum, a 2 mm-thick layer of silicone rubber 6, having a rubber hardness of 20°, covering the surface of the core, and a 50 μm-thick polytetrafluoroethylene fluororesin 7 coated on the rubber. The surface temperature of the hot roll was regulated at 160° C.

[Fixer 2 (equipped with oil feed mechanism)]

Figure 2:
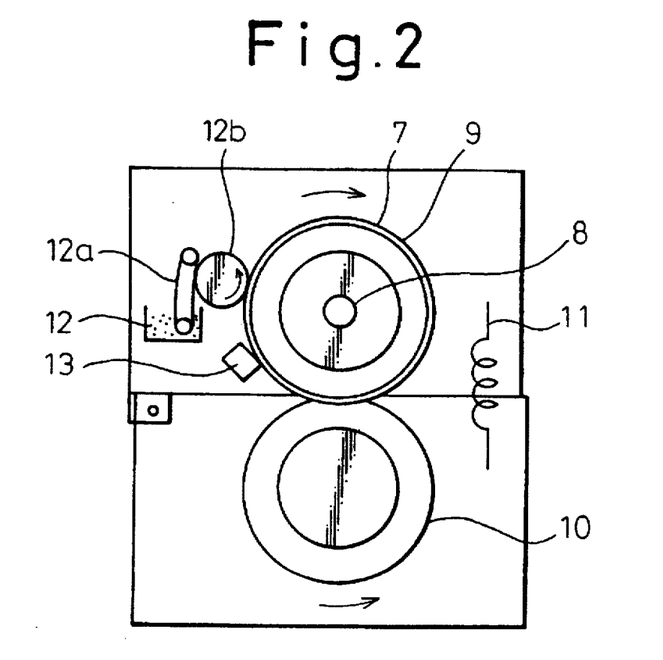
FIG. 2 is a diagram showing a fixer according to another embodiment of the present invention.

The fixer, according to the second embodiment of the present invention, as shown in FIG. 2 comprises a hot roll 9 containing a heater 8 and a pressure roll 10. Both rolls are provided with a supplementary spring 11 at both sides to bring the hot roll and the pressure roll into press contact with each other at 4 kgf/m².

A fixing oil containing, as a release agent, a fluorosilicone polymer, which is a characteristic feature of the present invention, is placed in an oil feed tank 12 and then sucked into a rotary belt type felt 12a from which the fixing oil is homogeneously coated onto a feed roll 12b and then coated onto a hot roll 9. Numeral 13 designates a cleaning unit which serves to remove dust or other contaminants deposited on the surface of the fixing roll.

The hot roll comprised a core of aluminum, a 2 mm-thick layer of silicone rubber, having a rubber hardness of 60°, covering the core, and a 50 μm-thick perfluoroalkoxy resin coated on the rubber. The resin contained 1% by weight of carbon as a conductive fine powder. The hot roll temperature was regulated at 180° C.

[Example 1]

Continuous full-color printing was carried out using the toner 2 (color toner: three colors) on 200,000 sheets by means of a full-color printer, capable of conducting full-color printing at a process speed of 100 mm/sec, equipped with the fixing mechanism 1 wherein the above fluorosilicone polymer 1 as a release agent was used in the step of fixation using the fixing mechanism 1. As a result, neither offset nor deterioration in surface of the roll was observed, and a smooth fixed image with good image properties could be formed. Further, heating of the hot roll up to 200° C. caused no vaporization of the silicone polymer.

[Example 2]

Continuous printing was carried out using the toner 1 (black toner) on 200,000 sheets by means of a monochrome printer, capable of conducting printing at a process speed of 200 mm/sec, equipped with the fixing mechanism 2 wherein the above fluorosilicone polymer 2 was used in the step of fixation using the fixing mechanism 2. In this printing, a felt impregnated with the fluorosilicone polymer was replaced with a fresh one after each 20,000 sheets. As a result, neither offset nor deterioration in surface of the roll was observed, and a smooth fixed image with good image properties could be formed. Further, heating of the hot roll up to 200° C. caused no vaporization of the silicone polymer.

[Example 3]

Continuous full-color printing was carried out using the toner 2 (color toner: three colors) on 200,000 sheets by means of a full-color printer, capable of conducting full-color printing at a process speed of 150 mm/sec, equipped with the fixing mechanism 1 wherein the above fluorosilicone polymer 3 as a release agent was used in the step of fixation using the fixing mechanism 1. As a result, neither offset nor deterioration in surface of the roll was observed, and a smooth fixed image with good image properties could be formed. Further, heating of the hot roll up to 200° C. caused no vaporization of the silicone polymer.

[Example 4]

The procedure of Example 1 was repeated, except that the fluorosilicone polymer used had a viscosity of 50 cSt at 25° C. As a result, good results could be obtained as in the case of Example 1.

[Example 5]

The procedure of Example 2 was repeated, except that the fluorosilicone polymer used had a viscosity of 60000 cSt at 25° C. As a result, good results could be obtained as in the case of Example 2.

[Example 6]

The procedure of Example 1 was repeated, except that the release agent used was a 5:5 mixture of said fluorosilicone polymer 1 and a commercially available silicone oil (KF-96, manufactured by The Shin-Etsu Chemical Co., Ltd.). As a result, good results could be obtained as in the case of Example 1.

[Example 7]

The procedure of Example 2 was repeated, except that the fluoroalkyl group in the fluorosilicone polymer used was $C_{15}F_{31}$—. As a result, good results could be obtained as in the case of Example 2.

[Example 8]

The procedure of Example 2 was repeated, except that the fluoroalkyl group in the fluorosilicone polymer used was $C_9F_{19}$—. As a result, good results could be obtained as in the case of Example 2.

[Example 9]

The procedure of Example 2 was repeated, except that the fluorosilicone polymer used was a mixture of a fluorosilicone polymer in which the fluoroalkyl group is $C_4F_9$— with a fluorosilicone polymer in which the fluoroalkyl group is $C_8F_{17}$—. As a result, good results could be obtained as in the case of Example 2.

[Example 10]

The procedure of Example 1 was repeated, except that the fluorosilicone polymer used was the fluorosilicone polymer 4. As a result, good results could be obtained as in the case of Example 1.

[Example 11]

The procedure of Example 1 was repeated, except that the fluorosilicone polymer used was the fluorosilicone polymer 5. As a result, good results could be obtained as in the case of Example 1.

[Example 12]

The procedure of Example 1 was repeated, except that the fluorosilicone polymer used was the fluorosilicone polymer 7. As a result, good results could be obtained as in the case of Example 1.

[Comparative Example 1]

The procedure of Example 1 was repeated, except that a fixing roll having no fluororesin coating was used instead of the roll of Example 1. As a result of evaluation, it was found that, due to poor affinity of the fluorosilicone polymer for the fixing roll, the anti-offset effect of the oil could not be attained and offset with poor image properties occurred in one sheet among about ten sheets.

[Comparative Example 2]

The procedure of Example 2 was repeated, except that a commercially available silicone oil (KF-96, manufactured by The Shin-Etsu Chemical Co., Ltd.) was used as the release agent. As a result of evaluation, it was found that, due to poor affinity of the fluorosilicone oil for the fixing roll, the anti-offset effect of the oil could not be attained and offset occurred in the proportion of one sheet in about ten sheets, resulting in poor image properties. The contact angle of the silicone oil with a teflon plate was 35°.

[Comparative Example 3]

The procedure of Example 1 was repeated, except that the fluoroalkyl group contained in the fluorosilicone polymer used was $CF_3$—. As a result of evaluation, it was found that the fluorosilicone polymer had a surface tension of 25 dyn/cm$^2$ and, due to poor affinity of the fluorosilicone polymer for the fixing roll, the anti-offset effect of the oil could not be attained and offset occurred, resulting in poor image properties.

[Comparative Example 4]

The procedure of Example 1 was repeated, except that the fluoroalkyl group contained in the fluorosilicone polymer was $C_{16}F_{31}$—. As a result, the viscosity of the polymer was too high to obtain the polymer.

[Comparative Example 5]

The procedure of Example 1 was repeated, except that the fluorosilicone polymer used had a fluorine content of 3%. As a result of evaluation, it was found that, due to poor affinity of the fluorosilicone polymer for the fixing roll, the anti-offset effect of the oil could not be attained and offset occurred, resulting in poor image properties.

[Comparative Example 6]

The procedure of Example 2 was repeated, except that the fluorosilicone polymer used had a fluorine content of 85%. As a result of evaluation, the fluorosilicone polymer had an excessively high viscosity and, hence, was difficult to coat onto an oil felt and offered no anti-offset effect.

[Comparative Example 7]

The procedure of Example 1 was repeated, except that the fluorosilicone polymer used had a fluorine content of 15%. As a result of evaluation, it was found that, due to somewhat poor affinity of the fluorosilicone polymer for the fixing roll, offset occurred in the proportion of one sheet in 10,000 sheets.

[Comparative Example 8]

The procedure of Example 1 was repeated, except that the fluorosilicone polymer used had a fluorine content of 65%. As a result of evaluation, good results could be obtained as in the case of Example 1. However, the production cost is unfavorably high.

[Comparative Example 9]

The procedure of Example 1 was repeated, except that the fluorosilicone polymer used had a number average molecular weight of 800 and a weight average molecular weight of 1200. As a result of evaluation, it was found that the fluorosilicone polymer began to vaporize when the temperature of the hot roll reached about 130° C., causing contamination in the device.

[Comparative Example 10]

The procedure of Example 1 was repeated, except that the fluorosilicone polymer had a number average molecular weight of 40000 and a weight average molecular weight of 50000. As a result of evaluation, the viscosity of the fluorosilicone polymer was so high that it was difficult to coat the polymer onto an oil felt and offered no anti-offset effect.

[Comparative Example 11]

The procedure of Example 1 was repeated, except that the fluorosilicone polymer used had a number average molecular weight of 2000 and a weight average molecular weight of 3000 with the proportion of a fluorosilicone polymer having a molecular weight of not more than 500 to the whole fluorosilicone polymer being 10%. As a result of evaluation, it was found that the fluorosilicone polymer began to vaporize when the temperature of the hot roll reached about 140° C., causing contamination in the device.

[Comparative Example 12]

The procedure of Example 1 was repeated, except that the fluorosilicone polymer used had a number average molecular weight of 5000 and a weight average molecular weight of 1500 with the proportion of a fluorosilicone polymer having a molecular weight of not more than 1500 to the whole fluorosilicone polymer being 7%. As a result of evaluation, it was found that the fluorosilicone polymer began to vaporize when the temperature of the hot roll reached about 190° C., causing contamination in the device.

[Comparative Example 13]

The procedure of Example 1 was repeated, except that the fluorosilicone polymer used had a viscosity of 8 cSt at 25° C. As a result of evaluation, it was found that the viscosity of the fluorosilicone polymer was so low that it was difficult to coat the oil onto the hot roll, offering no anti-offset effect.

[Comparative Example 14]

The procedure of Example 1 was repeated, except that the fluorosilicone polymer used had a viscosity of 3500 cSt at 25° C. As a result of evaluation, it was found that the viscosity of the fluorosilicone polymer was so high that the polymer could not be smoothly fed from the oil tank into the hot roll and offered no anti-offset effect.

[Comparative Example 15]

The procedure of Example 2 was repeated, except that the fluorosilicone polymer used had a viscosity of 800 cSt at 25° C. As a result of evaluation, it was found that the viscosity of the fluorosilicone polymer was so low that it was difficult to impregnate and hold the fluorosilicone polymer in an oil felt and offered no anti-offset effect.

[Comparative Example 16]

The procedure of Example 2 was repeated, except that the fluorosilicone polymer used had a viscosity of 70000 cSt at 25° C. As a result of evaluation, it was found that the viscosity of the fluorosilicone polymer was so high that it was difficult to impregnate the fluorosilicone polymer into an oil felt and offered no anti-offset effect.

[Comparative Example 17]

The procedure of Example 1 was repeated, except that the pressure of the hot roll was 0.5 kgf/cm$^2$. As a result of evaluation, it was found that the pressure was so low that the smoothness of the resultant image was lowered and a poor full-color image was produced.

[Comparative Example 18]

The procedure of Example 1 was repeated, except that the pressure of the hot roll was 5 kgf/cm$^2$. As a result of evaluation, it was found that the pressure was so high that paper jams frequently occurred, making it impossible to stably carry out printing.

[Comparative Example 19]

The procedure of Example 1 was repeated, except that the thickness of the fluororesin layer coated on the surface of the hot roll was 5 μm. As a result of evaluation, it was found that the layer strength was lowered and, after printing on 10000 sheets, deterioration of the surface of the roll occurred and resulted in poor image properties.

[Comparative Example 20]

The procedure of Example 1 was repeated, except that the thickness of the fluororesin layer coated on the surface of the hot roll was 120 μm. As a result of evaluation, the hardness of the roll was so high that the surface of the resultant fixed image had a lowered smoothness and the image properties were also poor.

[Comparative Example 21]

The procedure of Example 1 was repeated, except that the temperature of the hot roll was set at 120° C. As a result of evaluation, it was found that a failure to fix the image frequently occurred.

[Comparative Example 22]

The procedure of Example 2 was repeated, except that the temperature of the hot roll was set at 210° C. As a result of evaluation, it was found that offset occurred in the proportion of one sheet in 100 sheets.

[Comparative Example 23]

The procedure of Example 1 was repeated, except that a rubber layer having a hardness of 8° was provided as an intermediate layer of the hot roll. As a result of evaluation, it was found that the nip width was excessively large, causing the paper to be frequently wound round the roll.

[Comparative Example 24]

The procedure of Example 1 was repeated, except that a rubber layer having a hardness of 65° was provided as an intermediate layer of the hot roll. As a result of evaluation, it was found that the hardness of the roll was so high that the surface of the resultant fixed image had a lowered smoothness and poor image properties.

[Comparative Example 25]

The procedure of Example 1 was repeated, except that the toner used had, at 150° C., a storage modulus of 8 dyn/cm$^2$ and a loss elastic modulus of 9 dyn/cm$^2$. As a result of evaluation, it was found that the viscoelasticity of the toner was so low that offset frequently occurred.

[Comparative Example 26]

The procedure of Example 1 was repeated, except that the toner used had, at 150° C., a storage modulus of 200,000 dyn/cm$^2$ and a loss elastic modulus of 220,000 dyn/cm$^2$. As a result of evaluation, it was found that the viscoelasticity of the toner was so high that the resultant image had a poor smoothness.

[Comparative Example 27]

The procedure of Example 1 was repeated, except that a toner having a fluorosilicone polymer absorption of 1.5% by weight was used as the toner. As a result of evaluation, it was found that the resultant image had a deteriorated color tone and a lowered capability of being fixed.

[Comparative Example 28]

The procedure of Example 1 was repeated, except that a fluorosilicone polymer represented by the following chemical formula 35 (prepared in the same manner as in Production Examples 1 and 2 wherein the fluorosilicone polymers 4, 5, and 6 were produced, except that the molecular weight was different from that of the fluorosilicone polymers 4, 5, and 6). As a result, poor affinity Of the fluorosilicone polymer for the fixing roll caused offset, resulting in poor image properties.

(35)

The results of Examples 1 to 12 and Comparative Examples 1 to 28 are given respectively in Table 1 and Table 2.

TABLE 1

(Results of Examples)

| No. | Toner | Fixing mechanism | Process speed | Fluorosilicone polymer No. | Remarks | Remarks | Anti-offset property | Deterioration of roll | Glossiness | Image properties | Vaporization resistance |
|---|---|---|---|---|---|---|---|---|---|---|---|
| Ex. 1 | 1 | 1 | 100 mm/s | 1 | | | O | None | 25 | O | O |
| 2 | 2 | 2 | 200 | 2 | | | O | None | 15 | O | O |
| 3 | 1 | 1 | 150 | 3 | | | O | None | 20 | O | O |
| 4 | 1 | 1 | 100 | 1 | Viscosity: 50 cSt | | O | None | 18 | O | O |
| 5 | 2 | 2 | 200 | 1 | Viscosity: 60000 cSt | | O | None | 18 | O | O |
| 6 | 1 | 1 | 100 | | Mixture of fluorosilicone with silicone | | O | None | 18 | O | O |
| 7 | 2 | 2 | 200 | | Fluoroalkyl group: $C_{15}F_{31}$— | | O | None | 15 | O | O |
| 8 | 2 | 2 | 200 | | Fluoroalkyl group: $C_9F_{19}$— | | O | None | 14 | O | O |
| 9 | 2 | 2 | 200 | | Fluoroalkyl group: $C_4F_9$— | | O | None | 13 | O | O |
| 10 | 1 | 1 | 100 mm/s | 4 | | | O | None | 15 | O | O |
| 11 | 1 | 1 | 100 | 5 | | | O | None | 20 | O | O |
| 12 | 1 | 1 | 100 | 7 | | | O | None | 13 | O | O |

TABLE 2

Results of Comparative Examples)

| No. | Toner | Fixing mechanism | Process speed | No. | Remarks | Remarks Fluorosilicone polymer | Anti-offset property | Deterioration of roll | Glossiness | Image properties | Vaporization resistance |
|---|---|---|---|---|---|---|---|---|---|---|---|
| Comp. Ex. | | | | | | | | | | | |
| 1 | 1 | 1 | 100 | 1 | | No fluororesin applied to roll | X | None | 8 | X | O |
| 2 | 1 | 1 | 100 | | Not used | Silicone oil used | X | None | 12 | X | O |
| 3 | 1 | 1 | 100 | | Fluoroalkyl group: $CF_3$— | | X | None | 14 | X | O |
| 4 | 1 | 1 | 100 | | Fluoroalkyl group: $C_{16}F_{31}$— | Impossible to produce | | | | | |
| 5 | 1 | 1 | 100 | | Fluorine content: 85% | | X | None | 9 | X | O |
| 6 | 2 | 2 | 200 | | Fluorine content: 85% | | X | None | 9 | X | O |
| 7 | 1 | 1 | 100 | | Fluorine content: 15% | | Δ | None | 16 | Δ | O |
| 8 | 1 | 1 | 100 | | Fluorine content: 65% | High production cost (twice that of Ex. 1) | O | None | 18 | O | O |
| 9 | 1 | 1 | 100 | | Low molecular weight | | Δ | None | 15 | O | X |
| 10 | 1 | 1 | 100 | | High molecular weight | | X | None | 9 | X | O |
| 11 | 1 | 1 | 100 | | Large proportion of low-molecular weight component | | Δ | None | 15 | O | X |
| 12 | 1 | 1 | 100 | | Large proportion of low-molecular weight component | | Δ | None | 15 | O | Δ |
| 13 | 1 | 1 | 100 | | Low viscosity | | X | None | 9 | X | O |
| 14 | 1 | 1 | 100 | | High viscosity | | X | None | 12 | X | O |
| 15 | 2 | 2 | 200 | | Low viscosity | | Δ | None | 15 | X | O |
| 16 | 2 | 2 | 200 | | High viscosity | | X | None | 11 | X | O |
| 17 | 1 | 1 | 100 | 1 | | Low roll pressure | O | None | 4 | X | O |
| 18 | 1 | 1 | 100 | 1 | | High roll pressure | O | None | 18 | X | O |
| 19 | 1 | 1 | 100 | 1 | | Thin fluororesin layer | O | Occurred | 5 | X | O |
| 20 | 1 | 1 | 100 | 1 | | Thick fluororesin layer | O | None | 7 | X | O |
| 21 | 1 | 1 | 100 | 1 | | Low roll temp. | O | None | 5 | X | O |
| 22 | 1 | 1 | 100 | 1 | | High roll temp. | X | None | 18 | X | O |
| 23 | 1 | 1 | 100 | 1 | | Low roll rubber hardness | O | NOne | 5 | X | O |
| 24 | 1 | 1 | 100 | 1 | | High roll rubber hardness | O | None | 7 | X | O |
| 25 | | 1 | 100 | 1 | | Low viscoelastic toner | X | None | 7 | X | O |
| 26 | | 1 | 100 | 1 | | High viscoelastic toner | O | None | 4 | X | O |
| 27 | | 1 | 100 | 1 | | High absorption of fluorosilicone polymer into toner | O | NOne | 15 | X | O |
| 28 | 1 | 1 | 100 | 6 | | | X | None | 8 | X | O |

The present invention can provide an image forming device which can prolong the service life of a fixing roll, reduce the consumption of a release agent, lower the fixation initiation temperature and provide a good anti-offset property, a high smoothness in image surface and good print properties.

We claim:

1. An image forming device for use in electrophotography wherein an electrostatic latent image is developed, said device comprising a fixer provided with a fixing roll coated with an outermost layer of fluororesin for fixing a toner and means for coating as a release agent a fluorosilicone polymer onto the fluororesin-coated surface of the fixing roll.

2. The image forming device according to claim 1, wherein said fluorosilicone polymer has a long-chain fluoroalkyl group.

3. The image forming device according to claim 1, wherein said fluorosilicone polymer is represented by the following chemical formula 1:

(1)

wherein $R_1$ represents an alkylene or phenylene group, $R_2$ represents an alkyl, aryl, or olefinically unsaturated group and $R_f$ represents a perfluoroalkyl group having 2 to 15 carbon atoms.

4. The image forming device according to claim 1, wherein said fluorosilicone polymer is represented by the following chemical formula 2:

(2)

wherein $R_1$ represents an alkylene or phenylene group, $R_2$ represents an alkyl, aryl, or olefinically unsaturated group and $R_f$ represents a perfluoroalkyl group having 3 to 9 carbon atoms.

5. The image forming device according to claim 1, wherein said fluorosilicone polymer is represented by the following chemical formula 3:

(3)

wherein $R_1$ and $R_2$ represent an alkylene or phenylene group and $R_{f1}$ and $R_{f2}$ represent a perfluoroalkyl group having 2 to 15 carbon atoms.

6. The image forming device according to claim 1, wherein said fluorosilicone polymer is represented by the following chemical formula 4:

(4)

wherein $R_1$ and $R_2$ represent an alkylene or phenylene group and $R_{f1}$ and $R_{f2}$ represent a perfluoroalkyl group having 3 to 9 carbon atoms.

7. The image forming device according to claim 1, wherein said fluorosilicone polymer is a polymer prepared by polymerizing a cyclic polysiloxane having a fluoroalkyl group in an inert solvent capable of dissolving the cyclic polysiloxane and a polymer of the cyclic polysiloxane in the presence of a basic polymerization catalyst and then terminating the polymerization.

8. The image forming device according to claim 7, wherein said cyclic polysiloxane is a cyclic trisiloxane represented by the following chemical formula 5:

(5)

wherein $R_1$ represents an alkylene or phenylene group, $R_2$ represents an alkyl, aryl, or olefinically unsaturated group and $R_f$ represents a perfluoroalkyl group having 2 to 15 carbon atoms.

9. The image forming device according to claim 7, wherein said cyclic polysiloxane is a cyclic trisiloxane represented by the following chemical formula 6:

(6)

wherein $R_1$ represents an alkylene or phenylene group, $R_2$ represents an alkyl, aryl, or olefinically unsaturated group and $R_f$ represents a perfluoroalkyl group having 3 to 9 carbon atoms.

10. The image forming device according to claim 7, wherein said cyclic polysiloxane is a cyclic trisiloxane represented by the following chemical formula 7:

(7)

wherein $R_1$ and $R_2$ represent an alkylene or phenylene group and $R_{f1}$ and $R_{f2}$ represent a perfluoroalkyl group having 2 to 15 carbon atoms.

11. The image forming device according to claim 7, wherein said cyclic polysiloxane is a cyclic trisiloxane represented by the following chemical formula 8:

(8)

wherein $R_1$ and $R_2$ represent an alkylene or phenylene group and $R_{f1}$ and $R_{f2}$ represent a perfluoroalkyl group having 3 to 9 carbon atoms.

12. The image forming device according to claim 1, wherein said fluorosilicone polymer is a mixture of fluorosilicone polymers different from each other in the number of carbon atoms in $R_f$.

13. The image forming device according to claim 1, wherein said fluorosilicone polymer has a fluorine content of 5 to 80%.

14. The image forming device according to claim 1, wherein said fluorosilicone polymer has a fluorine content of 20 to 60%.

15. The image forming device according to claim 1, wherein said fluorosilicone polymer has a number average molecular weight of 1000 to 30000 and a weight average molecular weight of 1500 to 40000.

16. The image forming device according to claim 1, wherein said fluorosilicone polymer having a molecular weight of not more than 500 occupies less than 5% of the whole fluorosilicone polymer.

17. The image forming device according to claim 1, wherein said fluorosilicone polymer having a molecular weight of not more than 1500 occupies less than 5% of the whole fluorosilicone polymer.

18. The image forming device according to claim 1, wherein said fluorosilicone polymer has a surface tension of not more than 20 dyn/cm².

19. The image forming device according to claim 1, wherein the fluorosilicone polymer has a viscosity of 10 to 3000 cSt at 25° C. and an oil feed mechanism is provided as a mechanism for coating the release agent.

20. The image forming device according to claim 1, wherein the fluorosilicone polymer has a viscosity of 1000 to 60000 cSt at 25° C. and a cleaning member as a mechanism for coating the release agent is provided in press contact with the roll.

21. The image forming device according to claim 1, wherein the contact angle of the fluorosilicone polymer with a teflon plate is not more than 20°.

22. The image forming method according to claim 1, wherein said fluorosilicone polymer does not vaporize at 200° C.

23. The image forming device according to claim 1, wherein said fluorosilicone polymer is used in the form of a mixture with silicone oil.

24. The image forming device according to claim 1, wherein said fluorosilicone polymer is represented by the following chemical formula 9:

wherein $R_1$, $R_3$, $R_4$, $R_5$, $R_6$, $R_7$, and $R_8$ represent an alkylene or phenylene group, $R_2$ represents an alkyl, aryl, or olefinically unsaturated group and $R_f$ represents a perfluoroalkyl group having 2 to 15 carbon atoms and m and n are integers satisfying the formula $n/(n+m) \geq 0.1$.

25. The image forming device according to claim 1, wherein said fluorosilicone polymer is represented by the following chemical formula 10:

wherein $R_1$, $R_3$, $R_4$, $R_5$, $R_6$, $R_7$, and $R_8$ represent an alkylene or phenylene group, $R_2$ represents an alkyl, aryl, or olefinically unsaturated group and $R_f$ represents a perfluoroalkyl group having 3 to 9 carbon atoms and m and n are integers satisfying the formula $n/(n+m) \geq 0.1$.

26. The image forming device according to claim 1, wherein said fluorosilicone polymer is represented by the following chemical formula 11:

wherein $R_1$, $R_3$, $R_4$, $R_5$, $R_7$, and $R_8$ represent an alkylene or phenylene group, $R_2$ and $R_6$ represent an alkyl, aryl, or olefinically unsaturated group and $R_{f1}$ and $R_{f2}$ represent a perfluoroalkyl group having 2 to 15 carbon atoms and m and n are integers satisfying the formula $n/(n+m) \geq 0.1$.

27. The image forming device according to claim 1, wherein said fluorosilicone polymer is represented by the following chemical formula 12:

wherein $R_1$, $R_3$, $R_4$, $R_5$, $R_7$, and $R_8$ represent an alkylene or phenylene group, $R_2$ and $R_6$ represent an alkyl, aryl, or olefinically unsaturated group and $R_{f1}$ and $R_{f2}$ represent a perfluoroalkyl group having 3 to 9 carbon atoms and m and n are integers satisfying the formula $n/(n+m) \geq 0.1$.

28. The image forming device according to claim 1, wherein said fluorosilicone polymer is represented by the following chemical formula 13:

wherein $R_f$ represents a perfluoroalkyl group having 2 to 15 carbon atoms and m and n are integers satisfying the formula $n/(n+m) \geq 0.1$.

29. The image forming device according to claim 1, wherein said fluorosilicone polymer is represented by the following chemical formula 14:

wherein $R_f$ represents a perfluoroalkyl group having 3 to 9 carbon atoms and m and n are integers satisfying the formula $n/(n+m) \geq 0.1$.

30. The image forming device according to claim 1, wherein said fluorosilicone polymer is a polymer prepared by polycondensing a co-hydrolyzate of $R_fC_2H_4(CH_3)SiCl_2$ and $(CH_3)_2SiCl_2$ in the presence of $(CH_3)_3SiOSi(CH_3)_3$ as a molecular weight modifier and an acid catalyst or an alkali catalyst.

31. The image forming device according to claim 1, wherein said fluorosilicone polymer is a polymer prepared by ring-opening polymerization of $[R_fC_2H_4(CH_3)SiO]_x$ and $[(CH_3)_2SiO]_y$, wherein x and y are an integer of 3 to 5, in the presence of $(CH_3)_3SiOSi(CH_3)_3$ and an acid catalyst.

32. The image forming device according to claim 1, wherein said fluorosilicone polymer is represented by the following chemical formula 15:

wherein $R_{f1}$ and $R_{f2}$ represent a perfluoroalkyl group having 2 to 15 carbon atoms and m and n are integers satisfying the formula $n/(n+m) \geq 0.1$.

33. The image forming device according to claim 1, wherein said fluorosilicone polymer is represented by the following chemical formula 16:

wherein $R_{f1}$ and $R_{f2}$ represent a perfluoroalkyl group having 3 to 9 carbon atoms and m and n are integers satisfying the formula $n/(n+m) \geq 0.1$.

34. The image forming device according to claim 1, wherein the fixing roll applies pressure of 1 to 4 kgf/cm².

35. The image forming device according to claim 1, wherein the fluororesin coated on the surface of the roll is perfluoroalkoxy resin.

36. The image forming device according to claim 1, wherein the fluororesin coated on the surface of the roll is polytetrafluoroethylene.

37. The image forming device according to claim 1, wherein the fluororesin contains a conductive fine powder.

38. The image forming device according to claim 1, wherein the coating thickness of the fluororesin is 10 to 100 µm.

39. The image forming device according to claim 1, further comprising means for heating the roll to 160° to 200° C.

40. The image forming device according to claim 1, wherein the roll has an intermediate layer formed of an elastic material having a rubber hardness of 10 to 60 degrees.

41. The image forming device according to claim 40, wherein the intermediate layer is formed of a silicone rubber.

42. The image forming device according to claim 1, wherein image formation by electrophotography is carried out at a process speed of 10 to 300 m/sec.

43. The image forming device according to claim 1, wherein image formation by electrophotography is monochrome printing to provide a print having a glossiness of not less than 10.

44. The image forming device according to claim 1, wherein image formation by electrophotography is color printing using two or more colors.

45. The image forming device according to claim 1, wherein image formation by electrophotography is full-color printing.

46. The image forming device according to claim 1, wherein the toner is provided with a viscoelasticity such that, at 150° C., the loss elastic modulus is 10 to $10^5$ dyn/cm$^2$ and the storage modulus is 10 to $10^5$ dyn/cm$^2$.

47. The image forming device according to claim 1, wherein absorption of the release agent into the toner is less than 1%.

* * * * *